United States Patent Office 3,244,709
Patented Apr. 5, 1966

3,244,709
UNSATURATED TRIAZINE COMPOUNDS
Gaetano F. D'Alelio, South Bend, Ind., assignor, by direct and mesne assignments, to Dal Mon Research Co., Cleveland, Ohio, a corporation of Delaware
No Drawing. Filed Dec. 7, 1964, Ser. No. 416,611
13 Claims. (Cl. 260—248)

This application is a continuation-in-part of applicant's copending application Serial No. 222,665, now abandoned, filed September 10, 1962, and application Serial No. 764,253, filed September 30, 1958, and issued on September 11, 1962, as Patent No. 3,053,796.

This invention relates to new triazine compounds of the formula

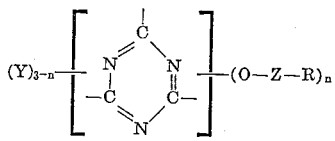

wherein $n$ is an integer having a value of at least 1 and no greater than 3; Z is a divalent aromatic radical having no more than 18 carbon atoms therein and selected from the class of alkylene-diphenylene, alkylene-napthylene, alkylene-diphenylene, cycloalkylene-phenylene, cycloalkylene - naphthylene hydrocarbon radicals and the chloro, fluoro, alkoxy, aryloxy, cycloalkoxy, alkenyloxy and acyloxy derivatives; R is an unsaturated hydrocarbon radical of the formula —$(CR_2'')_m$—$CR''$=$CH_2$ wherein $m$ is 0 or 1, and $R''$ is hydrogen, halogen, cyano, alkyl, aryl or cycloalkyl radical preferably of no more than 8 carbon atoms; and Y represents a monovalent radical defined more fully hereinafter preferably having no more than 20 carbon atoms and preferably selected from the class consisting of halogen, hydroxy, alkoxy, aryloxy, cycloalkoxy, alkenyloxy, amido, R'S—, alkenyl, alkyl, aryl, and cycloalkyl, and R' is hydrogen or alkyl, aryl or cycloalkyl, preferably of no more than 10 carbon atoms.

Compounds of the above structure are referred to hereinafter as triazinyl vinyl compounds or triazine monomers. For purposes of simplicity, the trivalent 1,3,5-triazine, or symmetrical triazine nucleus is represented by $C_3N_3$.

In the triazine monomers of this invention, Z is a divalent aromatic radical, predominantly hydrocarbon, having an arylene nucleus between said valencies (including alkylenearylene, cycloalkylenearylene radicals), which radicals may have substituent groups such as chloro, fluoro, alkoxy, aryloxy and acyloxy groups attached. The unsaturated radical R is attached directly to one valency and is joined directly thereby to the aryl nucleus. Illustrative examples of such divalent radicals include:

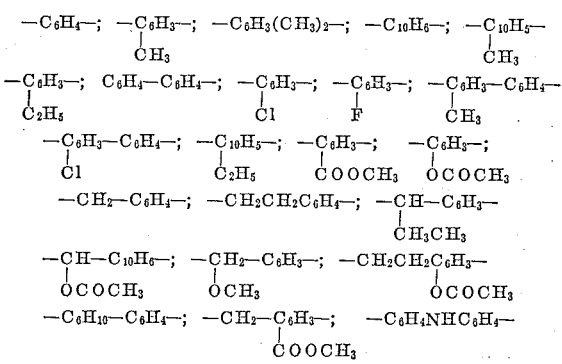

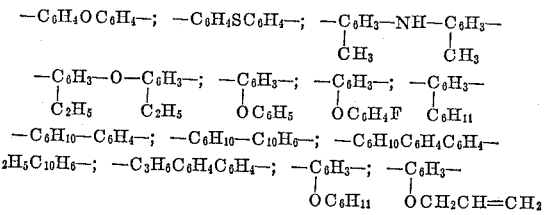

etc.

The substituent groups, such as the alkoxy, aryloxy, acyloxy, dialkylamino, diarylamino, etc. radicals, are advantageously radicals of no more than about ten carbon atoms, such as, methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, dimethylamino, diethylamino, dipropylamino, diphenylamino, dibenzylamino, etc. Other groups, such as nitroso, nitro, etc., can be used as substituents on the aryl groups provided they are inert during the preparation and use of the triazinyl vinyl monomer.

Also, without departing from the spirit of the invention, the carbon atoms in the divalent radical Z can be interrupted by an atom other than carbon, e.g.,

—$C_6H_4OC_6H_4$—; —$CH_2CH_2OC_6H_4$—;

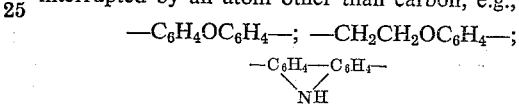

While other hydrocarbon and substituted hydrocarbon groups are also effective as Z groups, the groups indicated above are preferred for reasons of availability and economy.

The triazinyl vinyl compounds of this invention can be written as $(M)_n(C_3N_3(Y)_{3-n}$ in which M represents the radical containing the polymerizable group, and the other symbols are as defined above. Where the monomer contains only one polymerizable group, soluble, fusible polymers can be obtained.

When the monomer contains two polymerizable groups, that is $(M)_n$ is $(M)_2$ and the remaining or third group is the same or different from the M group, insoluble, infusible polymers can be produced therefrom. When $(M)_n$ is $(M)_2$, insoluble, infusible polymers and copolymers can still be obtained where the Y group is any other polymerizable or non-polymerizable monovalent radical.

For example, Y can be hydrogen and alkyl, aryl, aralkyl, alkaryl, cycloaliphatic and heterocyclic groups and their chloro, fluoro, alkoxy, aryloxy, acyloxy derivatives, such as methyl ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl phenyl, etc., radicals; Y can also be hydroxyl and the alkoxy and aryloxy radicals derived from aliphatic, cycloaliphatic, aromatic and heterocyclic hydroxy compounds such as methyl alcohol, ethyl alcohol, isopropyl alcohol, butyl alcohol, isobutyl alcohol, decyl alcohol, phenyl, the o-, m-, and p-cresols, the xylenols, naphthols, ethylene glycol, methyl glycol ether, butyl glycol ether, glycerine, penta erythritol, hydroxy naphthalene, hydroxy phenol, as well as the alkoxy and aryloxy radicals of hydroxy acids and esters such as lactic acids, ethyl lactate, salicylic acid, methyl salicylate, etc.

Thus, it may be seen that a wide variety of modified polymerizable triazinyl vinyl compounds can be prepared in accordance with the practice of this invention and this modification is achieved by the nature of the Y radical.

When one of the groups attached to the triazinyl ring contains a polymerizable ethylenic group which is not inhibited by the other atoms and groups in the monomer, then a soluble, or fusible, or soluble-fusible polymer is obtained on polymerizing the monomer. Such monomers can also be copolymerized with other monovinyl or monovinylidene monomers, hereinafter generally referred to as vinyl monomers, such as acrylonitrile, methyl methacrylate, etc., to produce modified thermoplastic compositions. It has been discovered that when two or more polymerizable groups are attached to the triazine ring, insoluble, infusible, heat-resistant, and in many cases self-extinguishing polymerization products are obtained. It has been further discovered that the triazinyl-vinyl monomers of this invention can be copolymerized with other monoolefinic and polyolefinic monomers to produce new materials having insolubility, infusibility, and heat resistance and valuable and characteristic properties that make them especially suitable for use in industry, for example, in molding, laminating, casting, coating, and adhesive applications, and for other purposes.

In accordance with this invention, homopolymers of the triazinyl vinyl compounds can be produced as well as compositions of matter comprising an interpolymer (copolymer) or interpolymers of at least one triazinyl vinyl compound of this invention and at least one other polymerizable compound containing the structures or groupings, $—CH=CH—$, $—CH=C<$, or $CH_2=C<$. Vinyl monomers of this invention are especially useful for the preparation of copolymers with unsaturated alkyd resins as disclosed and claimed in applicant's Patent 3,053,796, issued September 11, 1962, filed September 30, 1958, of which the present application is a continuation-in-part. This application is also a continuation-in-part of copending application Serial No. 222,665, filed September 10, 1962, now abandoned.

The triazinyl vinyl monomers of this invention, are also useful in the preparation of a large number of homopolymers when a single triazinyl vinyl monomer is used, or copolymers of triazinyl vinyl monomers when more than one such monomer is used as described more fully in the aforementioned copending application.

When it is desired to modify the properties of the polymers of the triazinyl vinyl monomers of this invention, this can be accomplished by copolymerizing a mixture comprising at least one triazinyl monomer with at least one copolymerizable unsaturated ethylenic, or acetylenic hydrocarbon radical, more particularly, a $$CH_2=C<$$

radical, such as vinyl, allyl, methallyl, vinylidene, etc., or with a copolymerizable compound containing a $$—CH=CH—$$

or a $—CH=C<$ or a $>C=C<$ grouping, for example, as in vinylidene chloride, vinylidene cyanide, vinyl chloride, maleic anhydride, or its esters and amides, methyl maleic anhydride, tetrafluoroethylene, etc., impregnating articles such as paper, wood, cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one triazinyl monomer of this invention and at least one unsaturated alkyd resin, with or without modifying agents, can be cast or molded under heat or under heat and pressure. The solid and semi-liquid thermoplastic and thermosetting materials of this invention can also be molded by injection, extrusion, or compression molding techniques, or by contact or low-pressure methods, whereby they are converted into a variety of molded articles for industrial, household, and novelty uses.

The monomers of this invention can also be added to preformed polymers, such as polyacrylonitrile, polyethylene, polystyrene, cellulose acetate, polyvinyl acetate, and then polymerized while admixed with the polymer by added catalysts, or they may be grafted to the polymer by irradiation, such as ionizing radiation from a cobalt or radioactive source, such as ionizing radiation from a linear electron accelerator, etc.

The symbol R represents a terminally unsaturated hydrocarbon radical having a $CH_2=C<$ grouping of the structure $CH_2CR''—(CR''_2)_m—$, wherein $m$ is zero or 1, and $R''$ is hydrogen, halogen, or a cyano, alkyl, aryl or cycloalkyl radical e.g., typical examples of R include

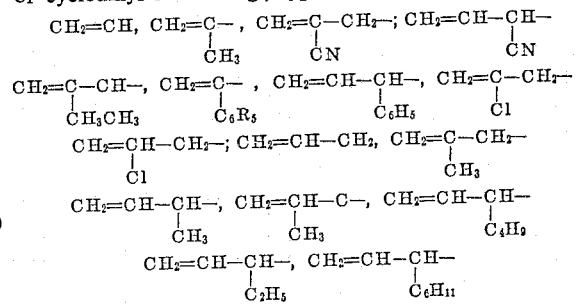

etc.
Preferably, because of the ease of polymerizability, $R''$ is hydrogen, as for example, in $CH_2=CH—$ and $CH_2=CHCH_2—$.

In view of the above definition of R, the monomers of this invention can also be written as $$Y_{3-n}(C_3N_3)[O—Z—(CR''_2)_m—CR''=CH_2]_n$$

wherein $m$ is 0 to 1, and $R''$ as defined above, preferably having no more than 8 carbon atoms therein.

$R'$ is selected from the class consisting of hydrogen and hydrocarbon radicals, such as: alkyl, aryl, alkaryl, aralkyl and cycloalkyl, as well as their halogenated, acetoxy, alkoxy, aryloxy, alkaryloxy, aralkoxy, etc. substitution derivatives, e.g., phenethyl, methyl, ethyl, propyl, butyl, amyl, hexyl, octyl, dodecyl, ethoxyethyl, vinyl, cyclohexyl, cyclopentyl, ethylcyclohexyl, amyl cyclohexyl, phenyl, tolyl, benzyl, naphthyl, chlorophenyl, methoxy phenyl, pentachlorophenyl, acetoxynaphthyl, fluoronaphthyl, ethoxynaphthyl, butyroxyphenyl, etc. For reasons of availability and economy, $R'$ is preferably hydrogen, methyl, or ethyl.

Various methods can be employed to produce the triazinyl vinyl monomers of this invention. One method of preparing these new monomers comprises effecting reaction between a halogenated triazine and MH, wherein M is the radical containing the polymerizable group as indicated above, which reaction is represented as follows, in each case using a hydrohalide acceptor such as sodium hydroxide:

$$(C_3N_3)Cl_3+3MH\rightarrow(C_3N_3)(M)_3+3HCl$$

When it is desired to modify the monomer of the presence of a Y gorup, this can be accomplished by first introducing the M group and then introducing the Y groups, for example:

$$(C_3N_3)Cl_3+2MH\rightarrow(M)_2(C_3N_3)Cl+2HCl$$
$$(M)_2(C_3N_3)Cl+YH\rightarrow(M)_2(C_3N_3)Y+HCl$$

or if the Y group is already attached to the triazine ring, then the M group can be attached as for example:

$$(Y)(C_3N_3)Cl_2+2MH\rightarrow(M)_2(C_3N_3)(Y);$$

or the Y group can be introduced first, before introducing the M group, as for example, $$(C_3N_3)Cl_3+YH\rightarrow Y(C_3N_3)Cl_2+HCl \text{ and } Y(C_3N_3)Cl_2+2MH\rightarrow Y(C_3N_3)(M)_2+2HCl$$

The reaction can be generalized further by the equation $$(Y)_{3-n}(C_3N_3)(Cl)_n+nMH\rightarrow(Y)_{3-n}(C_3N_3)(M)_n$$

and in the above equations halogen derivatives other than the chloride can also be used, and $n$, M and Y have the same meaning given hereinabove.

These reactions can be carried out in an anhydrous liquid medium such as ether, benzene, dioxane, acetone, etc., or in water or in mixtures of water with water-soluble solvents such as acetone, dioxane, preferably in the presence of an hydrohalide acceptor, such as sodium hydroxide, potassium hydroxide, sodium bicarbonate, sodium carbonate, pyridine, tributyl amine, etc., and at temperatures from below or about room temperature to temperatures corresponding to the refluxing temperature of the solvent or mixture of reactants.

Illustrative examples of halogenated triazine intermediates that can be used in the preparation of triazine monomers include the following: $C_3N_3Cl_3$; $C_3N_3Br_3$; $C_3N_3I_3$; $HOC_3N_3Cl_2$; $HOC_3N_3Br_2$; $(CH_3)_3CC_3N_3Cl_2$; $(C_2H_5)_3CC_3N_3Cl_2$; $CH_3OC_3N_3Cl_2$; $C_2H_5OC_3N_3Br_2$;

$$CH_2=CHCH_2OC_3N_3Cl_2$$

$HC_3N_3Cl_2$; $C_6H_5C_3N_3Cl_2$; $C_6H_{11}$—$C_3N_3Cl_2$;

$$C_3H_7COOCH_2CH_2OC_3N_3Cl_2$$

$ClC_6H_4OC_3N_3Cl_2$; $CH_3OC_6H_4OC_3N_3Cl_2$;

$$CH_3OOCC_6H_4C_3N_3Cl_2$$

$CH\equiv CCH_2OC_3N_3Cl_2$; $(CH_3O)_2C_3N_3Cl$;

$$(C_6H_5)(HO)(C_3N_3)Br$$

$(CH_2=CHCH_2O)_2C_3N_3Cl$.

Illustrative examples of the MH compounds that can be used as intermediates in the preparation of triazine monomers include: $HOC_6H_4CH=CH_2$;

$$HOCH_2C_6H_4CH_2CH=CH_2$$

$HOC_6H_4CH_2CH=CH_2$; $HOC_6H_3(CH_2CH=CH_2)_2$;

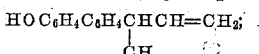

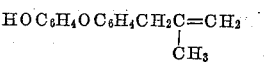

$HOC_6H_3(OC_6H_5)(CH_2CH=CH_2)$ $HOC_6H_{10}C_6H_4CH=CH_2$

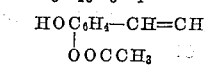

etc.

Methods of preparing the intermediates used in preparing the monomers of this invention are known in the art.

This invention will be more fully described by the following examples. The invention is not to be regarded, however, as restricted in any way by these examples and they are to serve merely as illustrations. In these examples, as well as throughout the specification, "parts" and "percentages" shall mean parts by weight and percentages by weight unless specifically provided otherwise.

EXAMPLE I

*Preparation of triazine monomers*

To 40 parts of para allyl phenol and 12 parts of sodium hydroxide in 200 parts of water is added slowly and with stirring 18.5 parts of cyanuric chloride in 50 parts of acetone in a flask equipped with means for refluxing. Upon completion of the addition of the chloride, there is added one part of 2,6-ditertiarybutyl para-cresol and the mixture is refluxed for about 4.5 hours and allowed to cool to room temperature, after which the mixture is filtered to remove the solid monomer. The monomer is washed with water and recrystallized from acetone-water mixtures. There is obtained $$C_3N_3(OC_6H_4CH_2CH=CH_2)_3$$

Ultimate analyses for carbon, hydrogen, nitrogen, and molecular weight determinations give values which are in close agreement with the theoretical values. Substitution of an equivalent amount of $C_4H_9O(C_3N_3)Cl_2$ in the foregoing procedure for the cyanuric chloride, yields the correspondnig triazine monomer, $$C_4H_9O-C_3N_3(O_6H_4CH_2=CH_2)_2$$

Ultimate analyses and molecular weight determination give values which check closely with the theoretical values.

By using equivalent quantities of ortho-vinyl phenol instead of the allyl compounds in the foregoing procedures, there is obtained $C_3N_3(OC_6H_4CH=CH_2)_3$, which gives on analysis 74.3% carbon; 4.79% hydrogen; 9.59% nitrogen; and a molecular weight of 433.9; all of which values are in close agreement with the theoretical values; and $C_4H_9OC_3N_3(OC_6H_4CH=CH_2)_2$, which gives values in close agreement with the theoretical values.

When it is desired to prepare monomers of this invention having two Y groups and one —O—Z—R group this can be done by using the same procedures as above, but using the corresponding stoichiometric amounts to give the number of substituent groups desired. When the two Y groups are different they are introduced separately but in the same manner described above and either before or after the —O—Z—R is introduced. For example, to prepare

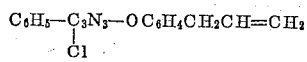

the reaction of $C_6H_5C_3N_3Cl_2$ is conducted with one molar equivalent of p-allyl phenol instead of the two molar equivalents used in the corresponding reaction in the above procedure. If it is desired to produce corresponding compounds in which another Y group is attached in place of the Cl, this can be accomplished by the procedures shown above and also in the literature for effecting such replacements.

Various publications teach how the different Y groups can be attached to the symmetrical triazine nucleus. Some of these publications as follows:

For introducing hydrocarbon-oxy groups:

Diels et al.: Ber. 36, 3191 (1903)
Hoffman: Ber. 19, 2061 (1886)
D'Alelio et al.: U.S. Patent 2,295,562
Ciba Swiss Patent 106,407
Dudley et al.: J.A.C.S. 73, 2986 (1951)
Schaefer et al.: J.A.C.S. 73, 2990 (1951)

For introducing hydrocarbon-thio groups:

Hoffman: Ber. 18, 2755 (1885)
Kalson: J. prakt. Chem. (2), 34, 152 (1886)
Ciba British Patent 318,275
D'Alelio et al.: U.S. Patent 2,295,561 and 2,295,562

For introducing hydrocarbon groups:

Hentrich et al.: U.S. Patent 1,911,689
Ostrogovich: Chem. Ztg. 36, 738 (1912)
Krafft: Ber. 22, 1759 (1889)
Kalson: J. prakt. Chem. (2), 35, 82 (1887)

For introducing halogen atoms:

Klason: J. prakt. Chem. (2), 34, 152 (1886)
Irving et al.: Ber. 19, 2061 (1886)

By these procedures, various triazine compounds of this invention are prepared having the following formulas:

$C_3N_3(OC_6H_4CH=CH_2)_3$; $C_3N_3(OC_6H_4CH_2CH=CH_2)_3$
$C_3N_3(OC_6H_4CH_2CH_2CH=CH_2)_3$; $CH_3O-C_3N_3(OC_6H_4CH_2CH=CH_2)_2$

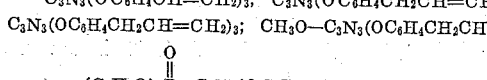

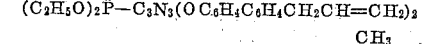
$CH_2=CH-CH_2-O-C_3N_3(OC_6H_4CH_2CH=CH_2)_2$
$CH=CHCH_2O-C_3N_3(OCH_2CH_2OC_6H_4CH=CH_2)_2$ $$Cl-C_3N_3-OC_6H_3(CH_3)_2-CH_2CH=CH_2$$
$$\quad\quad\quad\quad |$$
$$\quad\quad\quad OCH_3$$

$$Br-C_3N_3-(OC_{10}H_6CH=CH_2)_2$$

$$C_6H_5O-C_3N_3[OC_6H_3(Cl)-CH_2C(CH_3)=CH_2]_2$$

$$C_2H_5S-C_3N_3(OC_6H_4CHCH=CH_2)_2$$
$$\quad\quad\quad\quad\quad\quad |$$
$$\quad\quad\quad\quad\quad CH_3$$

$$C_3H_{11}-C_3N_3(OC_6H_4SC_6H_4CH_2CH=CH_2)_2$$

$$C_2H_5-C_3N_3-C_6H_3CH_2CH=CH_2$$
$$\quad |\quad\quad |$$
$$\quad Cl\quad OC_6H_5$$

$$ClC_6H_4-C_3N_3(OC_6H_3-CH_2CH=CH_2)_2$$
$$\quad\quad\quad\quad\quad\quad\quad |$$
$$\quad\quad\quad\quad\quad\quad C_6H_{11}$$

$$C_3N_3(OC_6H_4CH_2C=CH_2)_3;\quad C_6H_5-C_3N_3OC_6H_4CH_2C=CH_2$$
$$\quad\quad\quad\quad\quad\quad |\quad\quad\quad\quad\quad |\quad\quad\quad\quad\quad |$$
$$\quad\quad\quad\quad\quad Cl\quad\quad\quad\quad Br\quad\quad\quad\quad C_6H_{11}$$

$$C_6H_5-C_3N_3-OC_6H_4CH_2C=CH_2$$
$$\quad\quad\quad |\quad\quad\quad\quad\quad |$$
$$\quad\quad OCH_3\quad\quad\quad F$$

$$CH_3O-C_3N_3-OCH_2CH_2C_6H_4CH=CH_2$$

$$CH_3O-C_3N_3-OCH_2C_6H_4CH=CH_2$$
$$\quad\quad\quad |$$
$$\quad\quad Cl$$

The monomers of this invention are chemical compounds which can be used as chemical intermediates for the preparation of new compounds which can have utility other than in the preparation of polymers. As an example, these monomeric compounds can be halogenated, for example in carbon tetrachloride solution with $Cl_2$ or $Br_2$, to produce the chloro or bromo derivatives as illustrated by the reaction $$CH_3O-C_3N_3-OC_6H_4CH_2=CH_2 + Br_2 \longrightarrow$$
$$\quad\quad\quad |$$
$$\quad\quad Cl$$

$$CH_3O-C_3N_3-OC_6H_4CH_2CHBrCH_2Br$$
$$\quad\quad\quad |$$
$$\quad\quad Cl$$

When the monomer has 2 or 3 unsaturated groups the halogenation can be limited so as to leave one such unsaturated group and give a product which be polymerized, such as $$Cl-C_3N_3-OC_6H_4CH_2CH=CH_2$$
$$\quad\quad\quad |$$
$$\quad OC_6H_4CH_2CHBrCH_2Br$$

Polymers and copolymers prepared from this latter compound have built-in flame resistance. The halogenated compounds in which the unsaturation has been completely reacted with the halogen can be used as modifiers for polymers to give plasticity and improve their flame resistance.

Similarly chlorination gives $$CH_3O-C_3N_3-OC_6H_4CH_2CHClCH_2Cl$$

and $$Cl-C_3N_3-OC_6H_4CH_2CH=CH_2$$
$$\quad\quad\quad |$$
$$\quad OC_6H_4CH_2CHClCH_2Cl$$

These monomers can be epoxidized with $H_2O_2$ and an acid according to well-known procedures to give compounds such as $$CH_3O-C_3N_3(OC_6H_4CH_2CH_2CH\underset{O}{\overset{}{\diagdown\!\diagup}}CH_2)_2$$

These derivatives can be used as hydrohalide acceptors, intermediates in the preparation of adhesives and for the preparation of varnishes, paints, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:
1. The triazine compound having the formula

$$Y_{3-n}[C_3N_3][O-Z-(CR''_2)_m-CR''=CH_2]_n$$

wherein $n$ is an integer having a value of at least 1 and no more than 3; $m$ is an integer having a value of at least 0 and no more than 1; Z is a divalent radical having no more than 18 carbon atoms and being selected from the class consisting of phenylene, naphthylene, diphenylene, alkylene-phenylene, alkylene-naphthylene, alkylene-diphenylene, cycloalkylene-phenylene, cycloalkylene-naphthylene, cycloalkylene-diphenylene, diphenyleneoxide, diphenylenesulfide, diphenyleneamine and derivatives thereof in which each derivative group therein is selected from the class consisting of chloro, fluoro, alkoxy, aryloxy, cycloalkoxy, alkenyloxy and acyloxy groups, one of said valencies being directly attached to an aromatic nucleus in said group and also attached to said $-(CR''_2)_m-CR''=CH_2$ group; $R''$ is a radical of no more than 8 carbon atoms selected from the class consisting of hydrogen, halogen, cyano, alkyl, aryl and cycloalkyl radicals; Y is a monovalent radical having no more than 10 carbon atoms selected from the class consisting of halogen, hydroxy, alkoxy, aryloxy, cycloalkoxy, alkenyloxy, R'S—, alkenyl, alkyl, aryl and cycloalkyl; and R' is a radical selected from the class consisting of hydrogen, alkyl, aryl and cycloalkyl radicals having no more than 10 carbon atoms; $C_3N_3$ represents the trivalent symmetrical triazine nucleus.

2. The triazine compound having the formula
$$C_3N_3(OC_6H_4CH_2CH=CH_2)_3$$

3. The triazine compound having the formula
$$C_6H_5-C_3N_3-OC_6H_4CH_2CH=CH_2$$
$$\quad\quad\quad\quad |$$
$$\quad\quad\quad Cl$$

4. The triazine compound having the formula
$$C_3N_3(OC_6H_4CH=CH_2)_3$$

5. The triazine compound having the formula
$$CH_3O-C_3N_3-OCH_2CH_2C_6H_4CH=CH_2$$
$$\quad\quad\quad\quad |$$
$$\quad\quad\quad Cl$$

6. The triazine compound having the formula
$$CH_2=CHCH_2O-C_3N_3-OC_6H_4CH_2CH=CH_2$$
$$\quad\quad\quad\quad\quad\quad\quad |$$
$$\quad\quad\quad\quad\quad\quad Cl$$

7. The triazine compound having the formula
$$CH_3O-C_3N_3-OCH_2C_6H_4CH=CH_2$$
$$\quad\quad\quad\quad |$$
$$\quad\quad\quad Cl$$

8. The triazine compound having the formula
$$CH_3O-C_3N_3-OC_6H_4CH_2CH=CH_2$$
$$\quad\quad\quad\quad |$$
$$\quad\quad\quad Cl$$

9. The triazine compound having the formula
$$CH_3O-C_3N_3-OC_6H_4CH_2CHBrCH_2Br$$
$$\quad\quad\quad\quad |$$
$$\quad\quad\quad Cl$$

10. The triazine compound having the formula
$$Cl-C_3N_3-OC_6H_4CH_2CH=CH_2$$
$$\quad\quad\quad |$$
$$\quad OC_6H_4CH_2CHBrCH_2Br$$

11. The triazine compound having the formula
$$CH_3O-C_3N_3-OC_6H_4CH_2CHClCH_2Cl$$
$$\quad\quad\quad\quad |$$
$$\quad\quad\quad Cl$$

12. The triazine compound having the formula
$$Cl-C_3N_3-OC_6H_4CH_2CH=CH_2$$
$$\quad\quad\quad |$$
$$\quad OC_6H_4CH_2CHClCH_2Cl$$

13. The triazine compound having the formula
$$C_4H_9O-C_3N_3(OC_6H_4CH_2CH=CH_2)_2$$

References Cited by the Examiner

UNITED STATES PATENTS 3,053,796   9/1962   D'Alelio _____ 260—248

WALTER A. MODANCE, *Primary Examiner.*